United States Patent [19]
Carey et al.

[11] Patent Number: 5,980,967
[45] Date of Patent: *Nov. 9, 1999

[54] PRODUCTION OF CRISPY WHEAT-BASED SNACKS HAVING SURFACE BUBBLES

[75] Inventors: Julia M. Carey, Madison, N.J.; Mark J. Moisey, Center Valley, Pa.; Harry Levine; Louise Slade, both of Morris Plains, N.J.; Theresa E. Dzurenko, Parsippany, N.J.; Kevin McHugh, Oakland, N.J.; Ellen L. Zimmerman, Morristown, N.J.

[73] Assignee: Nabisco Technology Company, Wilmington, Del.

[*] Notice: This patent is subject to a terminal disclaimer.

[21] Appl. No.: 09/069,998

[22] Filed: Apr. 30, 1998

Related U.S. Application Data

[63] Continuation of application No. 08/637,839, Apr. 25, 1996, Pat. No. 5,747,092.

[51] Int. Cl.⁶ ............................ A21D 2/18; A23L 1/10
[52] U.S. Cl. ...................... 426/560; 426/559; 426/808
[58] Field of Search .............................. 426/549, 559, 426/560, 808

[56] References Cited

U.S. PATENT DOCUMENTS

| | | |
|---|---|---|
| 678,749 | 7/1901 | Moore et al. . |
| 1,039,912 | 10/1912 | Dollings . |
| 1,169,023 | 1/1916 | Embrey . |
| 1,975,326 | 10/1934 | Loose et al. . |

(List continued on next page.)

FOREIGN PATENT DOCUMENTS

| | | |
|---|---|---|
| 637258 | 2/1962 | Canada . |
| 0184964 | 6/1986 | European Pat. Off. . |
| 2267049 | 11/1975 | France . |
| 2604716 | 8/1976 | Germany . |

(List continued on next page.)

OTHER PUBLICATIONS

Chemical Abstract #58556d of 17 –Foods. vol. 80, 1974.
Tressler, Donald K. Ph.D., *Food Products Formulary*, vol. 2, Cerals, Baked Goods, Dairy and Egg Products, The AVI Publ. Co., Westport, CT., pp. 103–104 (1975).

(List continued on next page.)

*Primary Examiner*—Peter Chin
*Assistant Examiner*—Steven Leavitt

[57] ABSTRACT

Baked, wheat-based, chip-like snacks having a plurality of surface bubbles comprising air pockets extending both above and below the substantially unleavened, adjacent portions of the snack are obtained with a pregelatinized waxy starch, pregelatinized potato starch, and optional modified potato starch. The pregelatinized potato starch produces a crisp, crunchy texture in the baked snack. The pregelatinized waxy starch is at least substantially uniformly hydrated prior to baking for producing bubbles during baking and for retaining the bubbles. The pregelatinized potato starch is at least substantially uniformly hydrated prior to baking for controlling bubbling caused by the pregelatinized waxy starch and for controlling texture of the bubbled and unbubbled portions of the snack chips. Use of the gluten-containing wheat flour and bubble-forming amounts of the pregelatinized waxy starch provides for the production of a cohesive, non-sticky, extensible, continuously machinable dough. A modified potato starch which is activated during baking may be used to enhance surface bubbling and crispiness of the bubbled portions and unbubbled portions. The pregelatinized waxy maize starch may be used in an amount of from about 3% by weight to about 20% by weight, and the pregelatinized potato starch may be used in an amount of from about 1.5% by weight to about 20% by weight, each based upon the weight of the wheat flour. The weight ratio of the amount of the pregelatinized waxy starch to the total amount of the potato starches may be from about 0.45:1 to about 1:1. Non-fermented and fermented reduced fat, low-fat, and no-fat baked products, as well as full-fatted non-fermented and fermented baked products, may be produced with a bubbled surface, and a crispy, crunchy, non-mealy, chip-like texture, but with a wheat cracker flavor.

16 Claims, 1 Drawing Sheet

U.S. PATENT DOCUMENTS

| | | |
|---|---|---|
| 2,905,559 | 9/1959 | Anderson et al. . |
| 3,027,258 | 3/1962 | Markakis et al. . |
| 3,089,773 | 5/1963 | Bates et al. . |
| 3,194,664 | 7/1965 | Eytinge . |
| 3,276,397 | 10/1966 | Poppe et al. . |
| 3,278,311 | 10/1966 | Brown et al. . |
| 3,332,781 | 7/1967 | Benson et al. . |
| 3,348,950 | 10/1967 | Weiss . |
| 3,384,495 | 5/1968 | Potter et al. . |
| 3,451,822 | 6/1969 | Fast et al . |
| 3,493,390 | 2/1970 | Succo . |
| 3,519,432 | 7/1970 | Succo et al. . |
| 3,539,356 | 11/1970 | Benson et al. . |
| 3,545,979 | 12/1970 | Ghafoori . |
| 3,600,193 | 8/1971 | Glabe . |
| 3,615,658 | 10/1971 | Glabe . |
| 3,615,697 | 10/1971 | Hollenbeck . |
| 3,652,294 | 3/1972 | Marotta et al. . |
| 3,690,895 | 9/1972 | Amadon et al. . |
| 3,698,309 | 10/1972 | Steels . |
| 3,698,914 | 10/1972 | Kortschot et al. . |
| 3,698,915 | 10/1972 | Glasgow . |
| 3,753,729 | 8/1973 | Harms et al. . |
| 3,753,735 | 8/1973 | Gerkens . |
| 3,800,050 | 3/1974 | Popel . |
| 3,821,441 | 6/1974 | Tomita et al. . |
| 3,857,982 | 12/1974 | Sevenants . |
| 3,860,735 | 1/1975 | Hoshino . |
| 3,864,505 | 2/1975 | Hunter et al. . |
| 3,873,748 | 3/1975 | Schwab et al. . |
| 3,886,291 | 5/1975 | Willard . |
| 3,922,370 | 11/1975 | Prakash . |
| 3,925,567 | 12/1975 | Abe . |
| 3,935,322 | 1/1976 | Weiss et al. . |
| 3,937,848 | 2/1976 | Campbell et al. . |
| 3,946,116 | 3/1976 | Weaver et al. . |
| 3,956,517 | 5/1976 | Curry et al. . |
| 3,982,032 | 9/1976 | Koizumi . |
| 3,988,875 | 11/1976 | Fay . |
| 3,997,684 | 12/1976 | Willard . |
| 3,998,975 | 12/1976 | Liepa . |
| 4,005,139 | 1/1977 | Kortschot . |
| 4,044,166 | 8/1977 | Koizumi . |
| 4,073,958 | 2/1978 | Abe . |
| 4,109,012 | 8/1978 | Bates et al. . |
| 4,109,024 | 8/1978 | Cremer . |
| 4,122,198 | 10/1978 | Wisdom et al. . |
| 4,126,706 | 11/1978 | Hilton . |
| 4,135,004 | 1/1979 | Finkel . |
| 4,140,801 | 2/1979 | Hilton et al. . |
| 4,163,804 | 8/1979 | Meyer et al. . |
| 4,167,588 | 9/1979 | Willard . |
| 4,170,659 | 10/1979 | Totino et al. . |
| 4,208,476 | 6/1980 | |
| 4,209,536 | 6/1980 | Dogliotti . |
| 4,238,517 | 12/1980 | Bosley, Jr. et al. . |
| 4,266,920 | 5/1981 | Hayashi et al. . |
| 4,272,554 | 6/1981 | Schroeder et al. . |
| 4,277,510 | 7/1981 | Wicklund et al. . |
| 4,293,582 | 10/1981 | Hamann et al. . |
| 4,312,892 | 1/1982 | Rubio . |
| 4,326,455 | 4/1982 | Rubio . |
| 4,362,754 | 12/1982 | Wenger et al. . |
| 4,409,250 | 10/1983 | Van Hulle et al. . |
| 4,418,088 | 11/1983 | Cantenot . |
| 4,439,459 | 3/1984 | Swartley . |
| 4,446,163 | 5/1984 | Galle et al. . |
| 4,455,321 | 6/1984 | Glabe . |
| 4,505,942 | 3/1985 | Ito et al. . |
| 4,508,739 | 4/1985 | Ryan . |
| 4,517,204 | 5/1985 | Mottur et al. . |
| 4,526,800 | 7/1985 | Howard . |
| 4,528,202 | 7/1985 | Wang et al. . |
| 4,537,786 | 8/1985 | |
| 2,204,045 | 6/1940 | Meacham . |
| 2,505,407 | 4/1950 | Johnson . |
| 2,584,893 | 2/1952 | Lloyd et al. . |
| 2,704,257 | 3/1955 | Diez de Sollano et al. . |
| 2,767,667 | 10/1956 | Spooner . |
| 2,823,625 | 2/1958 | Oakes . ............................... Bernard . |
| 4,555,409 | 11/1985 | Hart . |
| 4,560,569 | 12/1985 | Ivers . |
| 4,567,051 | 1/1986 | Baker et al. . |
| 4,568,557 | 2/1986 | Becker et al. . |
| 4,609,557 | 9/1986 | Mao et al. . |
| 4,613,508 | 9/1986 | Shishido . |
| 4,615,901 | 10/1986 | Yoshioka et al. . |
| 4,623,548 | 11/1986 | Willard . |
| 4,623,550 | 11/1986 | Willard . |
| 4,640,843 | 2/1987 | Matuszak et al. . |
| 4,645,679 | 2/1987 | Lee, III et al. . |
| 4,650,687 | 3/1987 | Willard et al. . |
| 4,749,579 | 6/1988 | Haydock et al. . |
| 4,752,493 | 6/1988 | Moriki . |
| 4,767,633 | 8/1988 | Fowler . |
| 4,769,253 | 9/1988 | Willard . |
| 4,770,891 | 9/1988 | Willard . |
| 4,803,091 | 2/1989 | Mottur et al. . |
| 4,834,996 | 5/1989 | Fazzolare et al. . |
| 4,844,919 | 7/1989 | Szwerc ...................................... 726/94 |
| 4,855,151 | 8/1989 | Fielding . |
| 4,861,609 | 8/1989 | Willard et al. . |
| 4,863,750 | 9/1989 | Pawlak et al. . |
| 4,873,093 | 10/1989 | Fazzolare et al. . |
| 4,876,101 | 10/1989 | Willard . |
| 4,879,126 | 11/1989 | Willard et al. . |
| 4,880,371 | 11/1989 | Spinelli et al. . |
| 4,889,733 | 12/1989 | Willard et al. . |
| 4,889,737 | 12/1989 | Willard et al. . |
| 4,929,461 | 5/1990 | Schonauer et al. . |
| 4,931,303 | 6/1990 | Holm et al. . |
| 4,938,982 | 7/1990 | Howard . .................................. Tsao . |
| 4,994,295 | 2/1991 | Holm et al. . |
| 5,000,968 | 3/1991 | Szwerc et al. . |
| 5,061,507 | 10/1991 | Aulik et al. . |
| 5,104,673 | 4/1992 | Fazzolare et al. . |
| 5,147,675 | 9/1992 | Gage et al. . |
| 5,320,858 | 6/1994 | Fazzolare et al. . |
| 5,429,834 | 7/1995 | Addesso et al. ........................ 426/549 |
| 5,464,642 | 11/1995 | Villagran et al. . |
| 5,464,643 | 11/1995 | Lodge . |
| 5,500,240 | 3/1996 | Addesso et al. . |
| 5,505,978 | 4/1996 | Roy et al. . |
| 5,554,405 | 9/1996 | Fazzolare et al. . |
| 5,652,010 | 7/1997 | Gimmler et al. . |
| 5,690,982 | 11/1997 | Fazzolare et al. . |
| 5,695,804 | 12/1997 | Hnat et al. . |
| 5,747,092 | 5/1998 | Carey et al. . |

FOREIGN PATENT DOCUMENTS

| | | |
|---|---|---|
| 59-001786 | 1/1979 | Japan . |
| 54-32056 | 10/1979 | Japan . |
| 55-108250 | 8/1980 | Japan . |
| 59-031642 | 2/1984 | Japan . |
| 60-168361 | 8/1985 | Japan . |
| 60-244256 | 12/1985 | Japan . |
| 61-202658 | 9/1986 | Japan . |
| 370933 | 11/1973 | U.S.S.R. . |
| 107218 | 6/1917 | United Kingdom . |
| 1525631 | 9/1978 | United Kingdom . |
| 2111816 | 7/1983 | United Kingdom . |

OTHER PUBLICATIONS

"Low–Calorie, Baked Snack . . . 'Potato Pips'",*Engineered Foods Magazine*, p. 58 (Aug. 8, 1984).

Pyler, E.J., "Baking Science and Technology", Siebel Publ. Co., Chicago, IL, 1973, pp. 428–429.

Matz, S.A., *Cookie and Cracker Technology*, The AVI Publ. Co., Chapter 18, pp. 238–253 (1968).

Matz, S.A., *Cookie and Cracker Technology*, The AVI Publ. Co., pp. 265–266 (1968).

Pyler, E.J., *Baking Science & Technology*, Sosland Publishing Co., Merriam, KS, 1988, pp. 061–1062, 913, and 609.

*Foods and Food Preparation Encyclopedia*, Van Nostrand Reinhold Co., Inc., NY, NY, 1982, pp. 282–284.

Pesrosier, N.W., *Elements of Food Technology*, AVI Publ. Co., Inc., Westport, Conn., 1977, pp. 479–482 and 468–469.

Cerletti, et al., "Maize Germ Proteins, Their Composition, Nutritive Value and Functional Properties", *Proc. Int. Assoc. Cereal Chem. Symp. Amino Acid Composition and Biological Value of Cereal Proteins*, Budapest, Hungary 1983, R. Lasztity, M. Hidvegi, eds.

Encyclopedia of Food Technology, vol. 2, pp. 263–267, (1974), The AVI Publishing Company, Inc.

Kotschevar, L.H., *Standards, Principals, and Techniques in Quality Food Production*, Van Nostrad Reinhold, NY, NY, 1988, pp. 404–407.

Whistler, et al., *Starch: Chemistry and Technology*, Academic Press, Inc., pp. 588–590 (1984).

Matz, *Cookie and Cracker Technology*, 2nd ed., The AVI Publ. Co., Inc. (1968), pp. 11–12.

Atwell, et al., "The Terminology and Methodology Associated With Basic Starch Phenomena", *Cereal Food World*, vol. 33, No. 3, 1968, pp. 306–311.

Molina, et al., "Drum Drying For The Improved Production Of Instant Tortilla Flour," *Journal of Food Science*, vol. 42, No. 6, (1977), pp. 1432–1434.

Pizzarias Pizza Chips, Pizza Supreme, sample of packaging including list of ingredients from trademark appln. No. 74/080,043, Jan. 1991 (first use in commerce), Keebler Company, Elmhurst, IL.

Pizzarias Pizza Chips, Zesty Pepperoni, sample of packaging including list of ingredients from trademark appln. No. 74/080,043, Jan. 1991 (first use in commerce), Keebler Company, Elmhurst, IL.

Zings Snack Chips, sample of packaging including list of ingredients, May 1991 (first use in commerce), Nabisco, Inc., East Hanover, NJ, from file wrapper of USSN 74/122,575.

Zings Snack Chips, color reproduction of packaging, including list of ingredients, 1991 (use in commerce), Nabisco, Inc., East Hanover, NJ.

Zings Ranch Cracker Chips, color reproduction of packaging including list of ingredients, 1991 (use in commerce), Nabisco, Inc., East Hanover, NJ.

Zings Cheddar Snack Chips, 1991 (use in commerce), Nabisco, Inc. East Hanover, NJ.

Munch'ems Seasoned Original, sample of packaging, including list of ingredients from trademark appln. No. 74/088,762, Jan. 1991 (first use in commerce), Keebler Company, Elmhurst, IL.

Munch'ems Southwest Salsa, sample of packaging including list of ingredients, Keebler Co. 1996 (copyright date).

Munch'ems Crackers, list of ingredients obtained from Keebler Company web site (possible use in commerce 1991).

Munch'ems Sour Cream & Onions Crackers, list of ingredients obtained from Keebler Company web site (possible use in commerce 1991).

Munch'ems Southwest Salsa Crackers, list of ingredients obtained from Keebler Company web site (possible use in commerce 1996).

Munch'ems Ranch Crackers, list of ingredients obtained from Keebler Company web site (possible use in commerce 1996).

Munch'ems Cheddar Crackers, list of ingredients obtained from Keebler Company web site (possible use in commerce 1991).

Munch'ems Reduced Fat Sour Cream and Onion Crackers, list of ingredients obtained from Keebler Company web site (possible use in commerce 1996).

PRODUCTION OF CRISPY WHEAT-BASED SNACKS HAVING SURFACE BUBBLES

This is a continuation of application Ser. No. 08/637,839, filed on Apr. 25, 1996, now U.S. Pat. No. 5,747,092.

FIELD OF THE INVENTION

The present invention relates to the production of baked wheat-based snacks having a chip-like crispy texture and surface bubbles.

BACKGROUND OF THE INVENTION

Cohesive, machinable doughs which can be sheeted, stretched, and cut into pieces may be produced at room temperature when the doughs possess a high content of wheat or other gluten-containing flour. The baking of conventional wheat-based doughs into crackers provides a lamellar structure with generally uniform small cells and a tender, mealy, leavened texture. Upon mastication, the conventional crackers generally disperse more rapidly than does a chip. They do not provide a crunchy texture and a sensation of breaking into pieces with low molar compaction before dispersion as does a chip. Additionally, crackers are generally dockered to prevent pillowing and to provide a generally flat bottom surface and a blistered top surface. Oyster or soup crackers and snack crackers which have a pillowed appearance may be produced from wheat-based doughs by the elimination of dockering holes. However, these products still possess a leavened, tender, mealy texture and a cracker appearance, rather than a crisp, crunchy chip-like texture and chip-like appearance.

Filled baked crackers or snacks obtained by needle injection of fillings into hollow expanded snacks made from wheat flour are disclosed in U.S. Pat. No. 4,209,536 to Dogliotti, U.S. Pat. No. 4,613,508 to Shishido, U.S. Pat. No. 4,752,493 to Moriki, and U.S. Pat. No. 5,000,968 to Szwerc et al. Production of a chip-like snack having surface bubbles and surrounding crisp, thin regions is not disclosed in these patents. The doughs are formulated and processed to retain a puffed or pillowed shape after piercing of the baked, hollow piece.

A cellular structure is obtained by the use of egg white in the shell of the pastry product of U.S. Pat. No. 4,209,536 to Dogliotti.

In the process of U.S. Pat. No. 4,613,508 to Shishido, hard dough biscuits are prepared by baking a dough having 10–30 parts by weight of sugar, 10–25 parts by weight of edible fat or oil, 1.5–4.0% leavening agent, and 20–35 parts by weight of water per 100 parts by weight of cereal flour to obtain a degree of leavening of at least 280%.

The baked hollow expanded snacks in the form of a figure such as an animal or vehicle of U.S. Pat. No. 4,752,493 to Moriki are produced from a farinaceous raw mixture. The raw mixture is prepared by mixing from 60–95 parts by weight of at least one low swelling-capacity farinaceous material and 40–5 parts by weight of at least one high swelling-capacity farinaceous material. The low swelling-capacity material may be a non-glutinous cereal such as wheat, rye, maize, non-glutinous rice, sago, sorghum, triticale, millet and beans, or starches separated from these sources. The high swelling-capacity material may be potato, taro, tapioca, arrowroot, sweet potato, glutinous rice, waxy corn, or starches derived from these sources having their cell walls broken. The farinaceous raw mixture is partly gelatinized prior to rolling into a smooth sheet by the addition of hot water or by the action of steam, so as to raise the temperature of the farinaceous raw mixture to 65° C. to 90° C. According to Moriki, upon baking, the starch in the surface of the dough pieces is gelatinized, thereby forming a skin having good gas-holding capacity and excellent stretchability. Water and volatile materials in the dough pieces push the skin outward upon heating, so that the dough pieces expand and are internally split into two layers or shells, forming a hollow space therebetween.

The filled crackers of U.S. Pat. No. 5,000,968 to Szwerc et al. are produced from a dough containing proteolytic enzymes. The enzymes hydrolyze proteins of the flour, which relaxes the dough and thereby permits a hollow center to be formed, rather than a cellular center, as the cracker expands under the influence of the leavening agent during baking. This, it is disclosed, strengthens the shell of the cracker and permits the cracker to be filled by means of an injection needle piercing the surface of the cracker.

The production of chip-like, starch-based snacks having a crispy texture and surface blisters from starch-based compositions which have little or no gluten, such as potato flour or corn flour, is disclosed in U.S. Pat. Nos. 4,873,093 and 4,834,996 to Fazzolare et al. and U.S. Pat. Nos. 5,429,834 and 5,500,240 to Addesso et al. Starch-based compositions which have little or no gluten, when mixed with water, do not form a dough that is cohesive at room temperature and continuously machinable or sheetable. Machinability of doughs made from ingredients having little or no gluten may be improved by forming a dough under elevated temperature conditions, such as by steaming the ingredients, as disclosed in U.S. Pat. Nos. 4,873,093 and 4,834,996 to Fazzolare et al.

In the process of U.S. Pat. Nos. 5,429,834 and 5,500,240 to Addesso et al, use of a pregelatinized waxy starch provides for the production of cohesive, extensible, continuously machinable doughs from starchy materials or ingredients having starch with no or low gluten. These machinable doughs may be formed at room temperatures without the need for steaming or heat treatment to develop cohesiveness, extensibility, and machinability.

U.S. Pat. Nos. 4,931,303 and 4,994,295 to Holm et al disclose that in the production of fabricated snack products having controlled surface bubbling, the dough sheet must have cohesive properties which permit the surface or surfaces of the dough or preform to stretch relatively uniformly when forming bubbles during frying. The highly cohesive, non-adhesive dough, it is disclosed, can be made by adjusting the quantity of free gelatinized starch, the degree of retrogradation of the starch (thereby affecting the water absorption of a given quantity of the starch), and the concentration of any starch-complexing emulsifiers present. In the Holm et al process, a dough may be formed comprising, e.g., potato solids or corn solids, raw or pregelatinized starches, modified starches, flavorings, oils, and the like. For producing potato snacks, the preferred major ingredient in the potato dough is a dehydrated potato flake with high water-absorption capability. The dry ingredients are placed in a mixer and blended with water to obtain a dough having a moisture content of from about 30% to about 55%. According to Holm et al., higher moisture content means higher oil absorption during frying. It is further disclosed that doughs containing less than about 30% moisture are generally too dry, after the Holm et al. drying step, to create adequate bubbles. In the Holm et al. process, substantial moisture reduction of the dough is achieved by frying. During frying, the dough moisture content of about 30% to about 55% is reduced to obtain a fried product with a moisture content of about 1–2%.

U.S. Pat. No. 4,560,569 to Ivers discloses that in the production of a dough-based fried food product, a processed starch in either gelatinized or ungelatinized form is frequently added when a low-starch flour or flake is employed. Water, it is disclosed, is required to soften the flour, and depending upon the protein content of the flour, to form a network of protein (gluten), which is the framework of the product. According to Ivers, starch, which is present in flours, is used as a binder and is required for the unleavened product to expand upon frying. Dough stickiness and hardness of the cooked product may be controlled by the addition of oil to the dough to control the extent of the protein framework. The dough is prepared by adjusting the ratios of components and the mixing time to allow it to sheet uniformly at the desired thickness without sticking or tearing. According to Ivers, addition of a small amount of a lecithin-in-water suspension to the formulation of the dough-based fried snack foods improves the transfer, sheeting and cutting, and significantly reduces clumping during frying, without the rapid buildup of free fatty acids and without significant darkening of frying oil, normally associated with the frying of foods containing lecithin.

In the production of wheat-based baked snacks, it has been found that the inclusion of a pregelatinized starch in the dough to create surface bubbles tends to result in a styrofoam-like or compressible texture, rather than a highly crisp, crunchy texture. Also, if the pregelatinized starch is not sufficiently hydrated prior to baking, bubbles created during baking tend to collapse.

In the present invention, wheat-based, chip-like snacks having a crisp, crunchy chip-like texture and bubbles distributed over their surfaces are produced from cohesive, machinable, sheetable doughs, without using a frying step for substantial moisture reduction of the dough, thereby resulting in products having low fat content. Surface bubbles comprising air pockets which extend from opposing surfaces are created and maintained during baking. The bubbles are maintained in portions of the baked dough, even though surrounding or adjacent portions of the dough have been dockered or punctured before baking. A pregelatinized waxy starch provides an extensible surface film prior to baking, which helps to temporarily trap moisture below the expandable film surface upon baking. A pregelatinized potato starch, which is also activated (i.e. sufficiently hydrated) prior to baking, helps to reduce or control bubbling and to avoid a styrofoam-like texture. It produces a crispy, crunchy, substantially unleavened texture in portions of the snack adjacent to the bubbled portions, as well as in the bubbled portions. In addition, the machinable, continuously sheetable, wheat-based dough may be produced at low temperatures. Sufficient hydration of the pregelatinized waxy starch and pregelatinized potato starch may be achieved by premixing them with hot water or by providing sufficient dough lay time for hydration to occur. The crispy, bubbled, wheat-based snacks of the present invention include non-fermented and fermented reduced fat, low-fat, and no-fat baked products, as well as full-fatted non-fermented and fermented baked products.

SUMMARY OF THE INVENTION

The present invention provides a baked, wheat-based, chip-like snack having surface bubbles comprising air pockets extending both above and below the substantially unleavened, adjacent portions of the snack. Dockering or piercing of the dough prior to baking results in localized unleavened or thinned areas and does not prevent the attainment of a plurality of discrete bubbles. Non-fermented and fermented reduced fat, low-fat, and no-fat baked products, as well as full-fatted non-fermented and fermented baked products, may be produced on a mass-production, continuous basis in accordance with the present invention. They are produced by admixing wheat flour, a film-forming, bubble-producing, pregelatinized waxy starch, and a pregelatinized potato starch with water to hydrate the starches and produce a machinable dough. Pregelatinized waxy maize starch is the preferred pregelatinized waxy starch. The pregelatinized potato starch produces a crisp, crunchy texture in the baked snack which would otherwise possess a styrofoam-like or compressible, leavened texture.

Uniform hydration of the pregelatinized waxy starch prior to baking is critical for producing bubbles during baking and for retaining the bubbles during baking and after baking. Also, uniform hydration of the pregelatinized potato starch prior to baking is critical for controlling bubbling caused by the pregelatinized waxy starch and for controlling texture of the bubbled and unbubbled portions of the snack chips. In embodiments of the invention, preheated hot water or fermentation lay time are used to at least substantially uniformly hydrate the pregelatinized waxy starch and the pregelatinized potato starch. Use of the gluten-containing wheat flour and bubble-forming amounts of the pregelatinized waxy starch provides for the production of a cohesive, non-sticky, extensible, continuously machinable dough. In embodiments of the invention, a modified potato starch which is activated during baking may be used to enhance surface bubbling and crispiness of the bubbled portions and unbubbled portions.

The machinable doughs of the present invention may be formed at room temperatures, without the need for steaming or heat treatment to develop cohesiveness, extensibility, and machinability. The doughs may be machined using conventional cracker-dough technology, involving sheeting, dough-sheet lamination, dough-sheet thickness reduction, and cutting of the dough sheet into pieces.

In embodiments of the present invention, the dough pieces have a moisture content of from about 20% to about 50% by weight, preferably from about 23% by weight to about 38% by weight, more preferably from about 25% by weight to about 35% by weight. The moisture content of the dough pieces is reduced from these high levels to less than about 10% by weight, preferably less than about 5% by weight, most preferably less than about 3.5% by weight, by baking the pieces. This moisture reduction by baking results in baked pieces each having a plurality of surface bubbles distributed throughout their surfaces. The pieces may also include blisters interspersed with the bubbles. In embodiments of the present invention, frying may be performed subsequent to baking. The avoidance of frying for substantial moisture reduction of the dough pieces permits the attainment of crisp, chip-like snacks having a vegetable shortening or oil or fat content less than 20% by weight of the finished product.

In preferred embodiments of the present invention, a baked, wheat-based, chip-like snack having surface bubbles and the texture and appearance of a potato chip, but the taste or flavor of a fermented or non-fermented cracker, may be produced without a leavened, mealy texture.

The baked wheat-based snacks may be produced by admixing: 1) wheat flour, 2) the pregelatinized waxy starch in an amount of from about 3% by weight to about 20% by weight, preferably from about 5% by weight to about 15% by weight, based upon the weight of the wheat flour, 3) the pregelatinized potato starch in an amount of from about 1.5% by weight to about 20% by weight, preferably from about 3% by weight to about 13% by weight, based upon the weight of the wheat flour, 4) from 0% by weight to about 20% by weight, preferably from about 5% by weight to about 18% by weight, of the optional modified potato starch, based upon the weight of the wheat flour, and 5) water to hydrate said starches and to form a machinable dough having a moisture content of preferably from about 23% by weight to about 38% by weight. The total amount of said potato starches is preferably less than about 30% by weight, most preferably from about 8% by weight to about 25% by weight, based upon the weight of said wheat flour. In embodiments of the invention, the weight ratio of the amount of the pregelatinized waxy starch to the total amount of the potato starches is from about 0.45:1 to about 1:1.

The dough may then be laminated upon itself, reduced in thickness to form a thin sheet, and then cut into pieces. The dough pieces are heated to reduce their moisture content and to obtain chip-like products having a bubbled appearance and a crisp texture and which make an audible crunching sound upon mastication.

BRIEF DESCRIPTION OF THE DRAWINGS

The present invention is further illustrated by the accompanying drawings wherein.

DETAILED DESCRIPTION OF THE INVENTION

Figure 1:
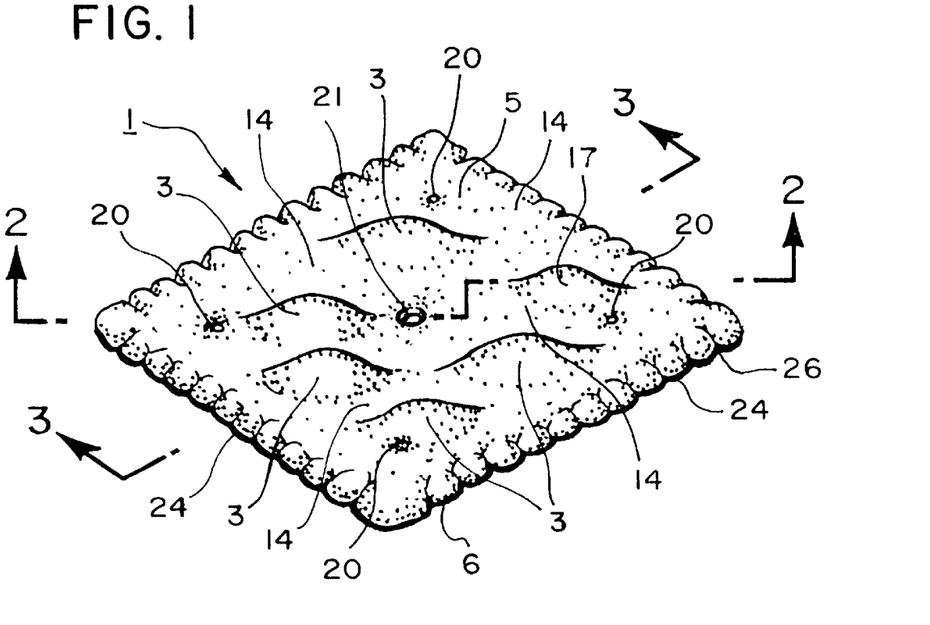
FIG. 1 is a perspective view of a bubbled snack of the present invention.
Figure 2:
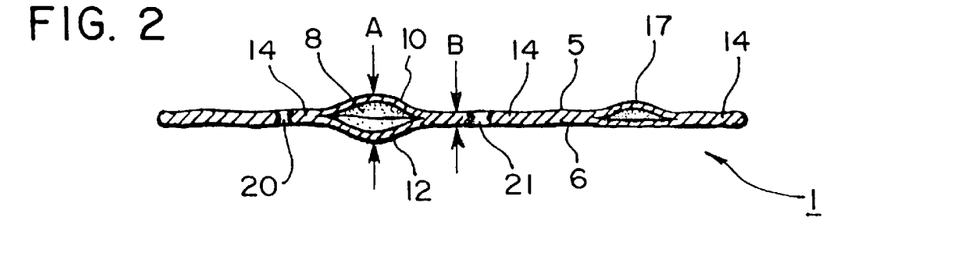
FIG. 2 is a cross-sectional view along line 2—2 of the snack of FIG. 1.
Figure 3:
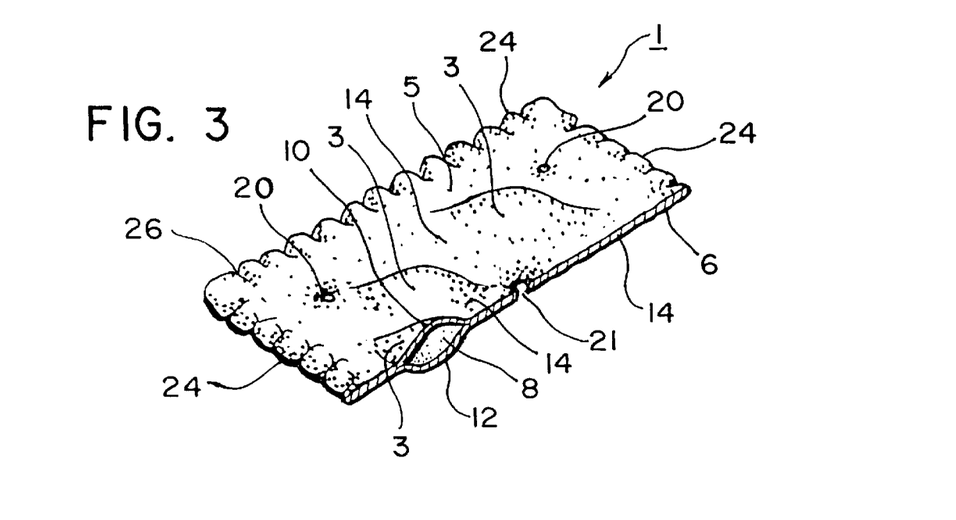
FIG. 3 is a cross-sectional perspective view along line 3—3 of the snack of FIG. 1.

The baked, wheat-based snacks of the present invention include non-fermented and fermented reduced fat, low-fat, and no-fat baked products, as well as full-fatted non-fermented and fermented baked products. They may have the taste or flavor of a wheat-based cracker, but the crispy, crunchy texture of a chip, rather than a leavened, mealy texture. Also, the snack chips 1 have surface bubbles 3 distributed over their top and bottom surfaces 5, 6 as shown, for example, in FIGS. 1, 2, and 3. As shown in FIGS. 2 and 3, the bubbles 3 provide air pockets 8 within thinned, concave downwardly curved upper walls 10 and thinned, concave upwardly curved lower walls 12. The bubbles 3 and the air pockets 8 each extend a substantial distance both above and below adjacent, generally flat, crispy, substantially unleavened, thin areas 14 of the baked pieces 1, as shown in FIGS. 1, 2, and 3.

The vertical dimensions of the bubbles 3 and of the air pockets 8 are substantially greater than the vertical dimensions of surrounding, adjacent, substantially flat areas 14 of the snack piece 1. In embodiments of the invention, the ratio of the maximum vertical distance A between the upper surface and lower surface of at least two bubbles 3 per piece 1 to the maximum thickness B of the adjacent, generally flat, crispy, unbubbled and non-blistered areas 14 is at least about 2:1, preferably at least about 2.5:1, most preferably at least about 2.75:1. The pieces 1 may also include one or more blisters 17 interspersed with the bubbles 3, as shown in FIGS. 1 and 2. The blisters 17 extend from only one surface, such as top surface 5, of the piece 1, whereas the bubbles 3 extend from opposing surfaces 5 and 6 of the piece 1.

In preferred embodiments, the snacks 1 are provided with one or more docker holes 20, 21 to reduce checking and to help to avoid pillowing or the creation of an entirely puffed surface. A plurality of discrete bubbles 3 may be obtained, even though the sheeted doughs of the present invention are dockered or pierced prior to baking. In embodiments of the invention, the central docker hole 22 may be larger than the remaining, surrounding docker holes 20. The peripheral edge 24 of the snack 1 may include scalloping or nicks 26 which extend around the entire periphery of the snack piece 1, as shown in FIGS. 1 and 3.

In accordance with the present invention, surface bubbling is achieved with the use of a film-forming pregelatinized waxy starch. The pregelatinized waxy starch is activated prior to baking by at least substantially hydrating it. The hydrated pregelatinized waxy starch provides an extensible surface film prior to baking, which temporarily traps moisture below the expandable film surface upon baking. A pregelatinized potato starch which is also activated prior to baking helps to reduce or control excessive bubbling and to avoid a styrofoam-like texture. It produces a crispy, crunchy, substantially unleavened texture in the bubbled portions of the snack, as well as in the remaining or unbubbled portions.

In the production of the wheat-based products, the pregelatinized waxy starch and the pregelatinized potato starch preferably have a high degree of starch gelatinization (as measured by differential scanning calorimetry (DSC)), so that they are more readily hydrated and more readily activated prior to baking. Generally, starch gelatinization occurs when: a) water in a sufficient amount, generally at least about 30% by weight, based upon the weight of the starch, is added to and mixed with starch and, b) the temperature of the starch is raised to at least about 80° C. (176° F.), preferably 100° C. (212° F.) or more. The gelatinization temperature depends upon the amount of water available for interaction with the starch. The lower the amount of available water, generally, the higher the gelatinization temperature. Gelatinization may be defined as the collapse (disruption) of molecular orders within the starch granule, manifested in irreversible changes in properties such as granular swelling, native crystallite melting, loss of birefringence, and starch solubilization. The temperature of the initial stage of gelatinization and the temperature range over which it occurs are governed by starch concentration, method of observation, granule type, and heterogeneities within the granule population under observation. Pasting is the second-stage phenomenon following the first stage of gelatinization in the dissolution of starch. It involves increased granular swelling, exudation of molecular components (i.e. amylose, followed by amylopectin) from the granule, and eventually, total disruption of the granules. See Atwell et al., "The Terminology And Methodology Associated With Basic Starch Phenomena," Cereal Foods World, Vol. 33, No. 3, pgs. 306–311 (March 1988). In embodiments of the present invention, the starch granules of the pregelatinized starches may be at least about 90% gelatinized, preferably at least about 95% gelatinized, most preferably completely gelatinized.

Pregelatinized waxy starches or pregelatinized high amylopectin-content starches which may be used in the present invention include pregelatinized waxy maize starch, pregelatinized waxy rice starch, and mixtures thereof. The preferred pregelatinized waxy starch for achieving cohesiveness, dough extensibility, and dough machinability is a modified waxy maize starch such as Modified Corn Starch X-Pand'R F4-612 produced by A.E. Staley Manufacturing Company. The preferred pregelatinized waxy maize starch is not chemically modified nor acid hydrolyzed. The pregelatinized waxy starch preferably has a moisture content of less than or equal to about 6% by weight and a pH of about 5 to about 6. The Brabender neutral viscosity of the pregelatinized waxy starch may be at least 680BU at 25° C., with the time required to reach peak viscosity at 25° C. being a maximum of 20 minutes. The particle size distribution of the pregelatinized waxy starch may be less than or equal to about 20% by weight retained on a 50 mesh screen and less than or equal to about 30% passing through a 200-mesh screen. If the particle size is too small, the pregelatinized starch tends to hydrate predominately on the surface. Increasing the particle size of the pregelatinized waxy starch tends to increase its ability to form homogeneous dry blends with the pregelatinized potato starch and optional, modified potato starch and reduces its tendency to form lumps.

The amount of the pregelatinized waxy starch which may be used in embodiments of the present invention range from about 3% by weight to about 20% by weight, preferably from about 5% by weight to about 15% by weight of the wheat flour. Amounts greater than about 20% by weight tend to result in a styrofoam-like or compressible, compactable, less crispy, crunchy texture.

Pregelatinized potato starches, which may be used in the present invention to provide a crisp, crunchy texture and to control film formation and bubble production induced by the pregelatinized waxy starch, include cold-water-swelling, pregelatinized potato starches which are optionally crosslinked. The amylose is preferably very long chain or high molecular weight, which enhances molecular entanglement, film formation, and film integrity. As the amount of the crosslinking increases, it restricts expansion, film formation, and bubbling, but it reduces variability. Thus, to provide a more predictable or uniform or controlled surface bubbling, the pregelatinized potato starch is preferably crosslinked. Also, the use of a pregelatinized starch facilitates hydration and activation prior to baking. A preferred pregelatinized potato starch for use in the present invention is a di-starch phosphate of potato starch, which is cold-water-swelling, such as Paselli P, manufactured by Avebe America, Inc. It is crosslinked but not esterified. The pregelatinized potato starch preferably has a moisture content of from about 4% by weight to about 7% by weight, a sulfated ash content of 0.1% maximum, a pH in a 5.0% aqueous solution of about pH 6.0 to about pH 7.5, and a viscosity at 20° C. of about 9000 cps to about 13000 cps. The particle size distribution of the pregelatinized potato starch may be less than or equal to about 4% by weight retained on a 120-mesh screen.

The pregelatinized potato starch may be used in an amount of from about 1.5% by weight to about 20% by weight, preferably from about 3% by weight to about 13% by weight, based upon the weight of the wheat flour. At levels of pregelatinized potato starch which are less than about 1.5% by weight, the texture becomes too mealy or leavened and less crispy and crunchy. The use of pregelatinized potato starch in amounts greater than about 20% by weight based on the weight of the wheat flour tends to result in a potato taste and tends to excessively reduce bubble production and retention.

A modified potato starch may optionally be included in embodiments of the present invention to enhance or promote surface bubbling and crispiness and crunchiness of the baked wheat-based snacks. The use of a raw modified potato starch provides functionality during baking, while the pregelatinized starches are functional prior to baking. Use of the heat-activated modified potato starch is preferred in the production of non-fermented or chemically leavened, wheat-based snacks to compensate for the generally short lay times available for complete hydration of the pregelatinized waxy starch and pregelatinized potato starch. Although the pregelatinized starches have sufficient time to completely hydrate during fermentation, a modified starch may also be used in the production of fermented or sponge-goods chips.

A preferred modified potato starch for use in embodiments of the present invention is an esterified potato starch such as Perfectamyl AC, manufactured by Avebe America, Inc. It is a raw, acetylated, but not crosslinked, potato starch. The modified potato starch may have a moisture content of about 170 to 190 mg/g, a pH of about 5.0 to about 7.0, and a sulfite content (as $SO_2$) of less than or equal to about 5 mg/kg. The particle size distribution of the modified potato starch may be less than or equal to about 8% by weight retained on a 120 U.S. mesh screen.

The optional modified potato starch may be used in an amount of from 0% by weight to about 20% by weight, based upon the weight of the wheat flour. In the production of non-fermented, wheat-based snack chips, the modified potato starch is preferably used in an amount of from about 5% by weight to about 18% by weight, based upon the weight of the wheat flour.

The pregelatinized potato starch and the optional modified potato starch are isolated potato starches, rather than starches present in a dehydrated potato product such as potato flakes or potato granules. The use of dehydrated potato products in the wheat-based snacks tends to result in a more mealy, mushy texture, whereas the same amount of an isolated starch provides a more desirable crispy, crunchy texture.

The pregelatinized potato starch and the optional modified potato starch promote a crispy, crunchy texture in the wheat-based snacks and also affect the amount of bubbles retained in the final product. Excessive amounts of the pregelatinized potato starch and the optional modified potato starch may substantially or completely eliminate the desired bubble formation. In embodiments where both a pregelatinized potato starch and a modified potato starch are used, the total amount of the pregelatinized potato starch and the modified potato starch is preferably less than about 30% by weight, preferably from about 8% by weight to about 25% by weight, based upon the weight of the wheat flour. The ratio of the amount of the pregelatinized waxy maize starch to the total amount of the pregelatinized potato starch and the optional modified potato starch is preferably from about 0.45:1 to about 1:1.

The wheat flour used in the wheat-based snacks of the present invention may be a flour of common wheat or triticum aestivum, and/or a flour of club wheat. Durham wheat generally provides a texture which is hard rather than crisp. In embodiments of the invention, it may be included in amounts which do not adversely affect texture and bubbling, for example, up to about 10% by weight of the wheat flour. Common wheat flour is preferred. The wheat flour may be from winter wheat or spring wheat, either of which may be soft or hard. The soft or hard wheats may be either red or white. Mixtures of different wheat flours may be used in the present invention. The wheat flours used in the present invention are preferably not extensively bleached, because extensively bleached flours tend to produce a cake-like, non-crispy texture. The protein or gluten content of the wheat flour should be sufficient to provide a sheetable, laminateable dough at temperatures of from about room temperature to about 125° F. Conventional wheat flours used for cracker production may be used in the present invention. Exemplary gluten contents of the wheat flours may range from about 7% to about 11% by weight of the flour.

The wheat flour may be used in an amount of from about 30% by weight to about 80% by weight, preferably from about 45% by weight to about 75% by weight, based upon the weight of the dough. Other flours, such as rice flour, corn flour, oat flour, and the like, tend to result in a mealy, styrofoam-like, less crunchy texture. They may be used in amounts which do not adversely affect bubble production and retention or a crispy, crunchy texture. It has been found that the use of graham flour or whole-wheat flour alone tends to reduce bubbling. It is believed that large-sized particles of graham flour may interrupt film formation or provide discontinuities in the film which cause bubble breakage. Also, highly water-absorbent components, such as wheat bran, present in the graham flour may interfere with hydration of the pregelatinized waxy starch. In embodiments of the present invention, wheat germ, preferably defatted wheat germ, may be used to obtain flavor and color provided by graham flour or whole-wheat flour, without adversely affecting bubble formation and retention. The wheat germ is preferably toasted to enhance flavor. Exemplary amounts of wheat germ which may be used range from about 5% by weight to about 15% by weight, based upon the weight of the wheat flour.

The amount of water added to produce the machinable doughs of the present invention should be sufficient to provide a moisture content of from about 20% by weight to about 50% by weight, more preferably from about 23% to about 38% by weight, most preferably from about 25% to about 35% by weight, based upon the weight of the dough.

As used herein, a reduced-fat food product is a product having its fat content reduced by at least 25% by weight from the standard or conventional product. A low-fat product has a fat content of less than or equal to three grams of fat per reference amount or label serving. However, for small reference amounts (that is, reference amounts of 30 grams or less or two tablespoons or less), a low-fat product has a fat content of less than or equal to 3 grams per 50 grams of product. A no-fat or zero-fat product has a fat content of less than 0.5 grams of fat per reference amount and per label serving. For accompaniment crackers, such as a saltine cracker, the reference amount is 15 grams. For crackers, or biscuits or wafers, used as snacks, and for chips, the reference amount is 30 grams. Thus, the fat content of a low-fat chip, snack, cracker, or wafer, would therefore be less than or equal to 3 grams of fat per 50 grams, or less than or equal to about 6% fat, based upon the total weight of the final product. A no-fat accompaniment cracker would have a fat content of less than 0.5 grams per 15 grams, or less than about 3.3%, based upon the weight of the final product. A no-fat chip, snack, or wafer having a label serving size of 28 grams would have a fat content of less than 0.5 grams per 28 grams, or less than about 1.8% by weight, based upon the weight of the final product.

Oleaginous compositions, which may be used to obtain the wheat-based baked full-fat, reduced-fat, low-fat, or no-fat baked snacks of the present invention, may include any known shortening or fat blends or compositions useful for baking applications, and they may include conventional food-grade emulsifiers. Vegetable oils, lard, marine oils, and mixtures thereof, which are fractionated, partially hydrogenated, and/or interesterified, are exemplary of the shortenings or fats which may be used in the present invention. Edible reduced- or low-calorie, or non-digestible fats, fat-substitutes, or synthetic fats, such as sucrose polyesters, which are process-compatible may also be used. Mixtures of hard and soft fats or shortenings and oils may be used to achieve a desired consistency or melting profile in the oleaginous composition. Exemplary of the edible triglycerides which can be used to obtain the oleaginous compositions for use in the present invention include naturally occurring triglycerides derived from vegetable sources such as soybean oil, palm kernel oil, palm oil, rapeseed oil, safflower oil, sesame oil, sunflower seed oil, and mixtures thereof Marine and animal oils such as sardine oil, menhaden oil, babassu oil, lard, and tallow may also be used. Synthetic triglycerides, as well as natural triglycerides of fatty acids, may also be used to obtain the oleaginous composition. The fatty acids may have a chain length of from 8 to 24 carbon atoms. Solid or semi-solid shortenings or fats at room temperatures of, for example, from about 75° F. to about 95° F. may be used. Preferred oleaginous compositions for use in the present invention comprise purified soybean oil in which the lecithin has been removed during purification. The added shortening or fat content of the wheat-based snack doughs of the present invention may range from about 0 to about 12% by weight, based upon the weight of the wheat flour, noninclusive of any topping oil. The shortening or fat content of the snack chips, inclusive of any topping oil, may be less than about 20% by weight, preferably less than about 10% by weight, based upon the weight of the dough.

One or more emulsifiers may be included in the doughs of the present invention to facilitate dough mixing, reduce dough stickiness, and facilitate machining, provided they do not adversely affect bubbling or the attainment of a crispy, crunchy texture. Exemplary of emulsifiers which may be used are mono- and di-glycerides, and fluid, unbleached lecithin derived from the phosphatides of phosphalipids of soybean oil. This fluid lecithin is an oil-based, flowable liquid at room temperature and typically has a moisture content of less than or equal to about 1% by weight. Exemplary amounts of the emulsifiers may range from about 0.1% to about 1% by weight, based on the weight of the wheat flour.

The chip-like snacks of the present invention may include process-compatible flavoring and texturizing ingredients, and leavening or pH-adjusting agents. Process-compatible ingredients, which can be used to modify the texture of the products produced in the present invention, include sugars such as sucrose, fructose, lactose, dextrose, galactose, maltodextrins, corn syrup solids, hydrogenated starch hydrolysates, protein hydrolysates, glucose syrup, mixtures thereof, and the like. Reducing sugars, such as fructose, maltose, lactose, and dextrose, or mixtures of reducing sugars may be used to promote browning. Fructose is the preferred reducing sugar, because of its ready availability and its generally more enhanced browning and flavor-development effects. Exemplary sources of fructose include invert syrup, high fructose corn syrup, molasses, brown sugar, maple syrup, mixtures thereof and the like.

The texturizing ingredient, such as sugar, may be admixed with the other ingredients in either solid or crystalline form, such as crystalline or granulated sucrose, granulated brown sugar, or crystalline fructose, or in liquid form, such as sucrose syrup or high fructose corn syrup. In embodiments of the invention, humectant sugars, such as high fructose corn syrup, maltose, sorbose, galactose, corn syrup, glucose syrup, invert syrup, honey, molasses, fructose, lactose, dextrose, and mixtures thereof, may be used to reduce hardness of the baked product and provide flavor and color.

In addition to the humectant sugars, other humectants, or aqueous solutions of humectants which are not sugars or possess a low degree of sweetness relative to sucrose, may also be employed in the dough. For example, glycerol, sugar alcohols such as mannitol, maltitol, xylitol and sorbitol, and other polyols, may be used as humectants. Additional examples of humectant polyols (i.e. polyhydric alcohols) include glycols, for example, propylene glycol and hydrogenated glucose syrups. Other humectants include sugar esters, dextrins, hydrogenated starch hydrolysates, and other starch hydrolysis products.

In embodiments of the present invention, the total sugar content, or the humectant texturizing-ingredient content, of the doughs may range from zero up to about 25% by weight, based upon the weight of the wheat flour. For example, crystalline sucrose and high fructose corn syrup may each be included in the dough in amounts ranging up to about 12% by weight, preferably from about 2% to about 10% by weight, based upon the weight of the wheat flour.

The dough compositions of the present invention may contain up to about 5% by weight of a leavening system or pH-adjusting agents, based upon the weight of the wheat flour. Exemplary of chemical leavening agents or pH-adjusting agents which may be used include alkaline materials and acidic materials such as sodium bicarbonate, ammonium bicarbonate, calcium acid phosphate, calcium phosphate (monobasic, monohydrate), sodium acid pyrophosphate, diammonium phosphate, tartaric acid, mixtures thereof, and the like. Yeast may be used alone or in combination with chemical leavening agents.

In addition to the foregoing, the snack chips of the invention may include other additives conventionally employed in crackers and snacks. Such additives may include, for example, milk by-products, egg or egg by-products, cheese, cocoa, salt, monosodium glutamate, vanilla or other flavorings. For example, salt may be added to the dough in an amount of up to about 3% by weight, based upon the weight of the wheat flour.

A source of protein, which is suitable for inclusion in baked goods, may be included in the snacks of the present invention to promote Maillard browning. The source of protein may include non-fat dry milk solids, dried or powdered eggs, mixtures thereof, and the like. The amount of the proteinaceous source may, for example, range up to about 5% by weight, based upon the weight of the wheat flour.

In embodiments of the present invention, enzymatic treatment may be used to alter the water-holding, non-cellulosic, cell-wall polysaccharides such as pentosans and/or beta-glucans in the dough environment. Pentosans, for example, hold a lot of water, even though they amount to only a minor fraction of the dough. Hydrolyzing the pentosans, or other hemicelluloses, so they permit release of water from the dough before the starch gelatinization temperature is reached during baking, helps to lower the extent of gelatinization of starch. Water released from the pentosans during baking may contribute to the production of surface bubbles or interact with or activate the modified potato starch.

The enzymes may be used at temperatures and pH conditions normally recommended by their manufacturers, or at conditions which are optimal for pentosanase or other hemicellulase activities. The enzymes may be acidic, neutral, or alkaline. Exemplary commercially available enzyme preparations which may be used in the present invention are: (1) PEN #3 Liquid Concentrate; manufactured by Quest International Bioproducts Group, 1833 57th Street, Sarasota, Fla., and 2) Multifect XL and Cytolase 123 (also known as GC123), manufactured by Genencor, Inc., 180 Kimball Way, South San Francisco, Calif. 94080. These enzyme preparations are cellulases from the microorganism Trichoderma reesei, which possess powerful pentosan-degrading activity. They are believed to comprise endo-cellulase, beta-glucanase, pentosanase, and beta-glucosidase. According to Genencor literature, when GC123 is evaluated in cereal grain applications, the enzyme should be added at about 0.2 percent w/w based on grain. It is indicated that, in many applications, this dosage can be substantially reduced. It is further indicated that optimal operating pH for the important activities in GC123 is generally centered around pH 4.8, and that considerable flexibility exists. Typically, it is reported, pH adjustment is not required when treating cereal grains suspended in tap water (pH approximately 6.2). According to the Genencor literature, optimal activity is generally found at about 50 to 60° C. (122 to 140° F.). The enzymes, it is stated, are also active at lower temperatures, but work less quickly. Higher temperatures (up to approximately 70° C.) may be used for short incubation times, but the activity is soon lost due to thermal inactivation.

The pentosanase content of hemicellulase enzymes is preferably measured as xylanase units of activity (XAU). The assay principle is this: xylanase activity is determined by the manufacturer with a simple calorimetric assay. A commercially available, soluble, dyed xylan is hydrolyzed, and the low molecular weight fragments are not precipitated by ethanol, leaving a colored supernatant. Xylanase activity of PEN #3 concentrate, for example, is about 10,250±750 XAU/ml. Exemplary amounts of the enzyme composition used in the present invention may range from about 200 to about 1500 XAU/lb flour, preferably from about 900 to about 1300 XAU/lb flour.

The enzyme may be added in liquid or powdered form. Liquid forms which have been diluted with water are preferred for facilitation of homogeneous distribution throughout the dough. Exemplary amounts of the enzyme composition used in the present invention, presented in aqueous solution, may be about 0.1% by weight to about 0.4% by weight of solution, based on the total weight of the flour. The enzyme solution may be prepared by admixing about 1 part by weight of enzyme concentrate with about 9 parts by weight of water.

Enzymes have optimal environments in which they function best. Care should be taken, with regard to enzyme treatment, to create a suitable environment for the enzyme. The pH of certain leavening agents is high, so they preferably should not be admixed with the enzyme in a concentrated manner. For example, in producing an unfermented cracker, the leavening agent is preferably well-dispersed with the other ingredients, prior to the addition of the enzyme.

Other enzymes conventionally used in cracker production, such as amylases and proteases, may be used in conventional amounts in embodiments of the present invention.

Conventional snack-flavoring, -seasoning, and -coloring ingredients, odorants, condiments, confections, and mixtures thereof may be blended into the dough composition or sprinkled upon the dough composition before baking or applied to the product after baking. Exemplary of such ingredients which may be used include flavorings such as barbecue, sour cream, chives, onion, garlic, butter, vinegar, honey mustard, ranch, bacon, chicken, beef, cheese, ham and peanut butter flavorings, nuts and seeds, vanilla, and chocolate products, dried vegetable flakes and herb flakes such as pepper, basil, thyme, peppermint, dried tomato, and parsley flakes, condiment flakes, fruit flakes, spices, cheese powders such as cheddar cheese and Nacho cheese seasoning powders, and mixtures thereof.

A problem may arise with the shelf-life of fat-free wheat-based baked snacks. They can go rancid more rapidly than snacks made with fat. This is believed to be because fat or shortening retards oxygenation and peroxide formation at points of unsaturation in naturally occurring grain lipids. Lipids are naturally present in grains such as wheat and wheat products such as flour. It is these lipids which can go rancid when fat-free snacks are made. At some point in the process, an antioxidizing agent such as naturally occurring antioxidants, including citric acid or tocopherols, or BHT, BHA or TBHQ, or mixtures thereof, can be added to prevent rancidity.

The machinable doughs may be produced in accordance with the present invention at dough temperatures of less than about 125° F., preferably less than about 120° F., and most preferably at temperatures of about 105° F. to 115° F. At dough temperatures above about 120° F., dough stickiness tends to increase and may adversely affect lamination and sheetability. In the production of fermented or sponge-good snack chips, the dough is produced at temperatures preferably less than or equal to about 100° F., preferably from about 70° F. to about 80° F. in the sponge-setting stage, and preferably from about 85° F. to about 96° F. in the dough-up stage, so as to avoid killing the buffer or bacteria and yeast used in the fermentation. Ingredients may be added at 70° F. or above and mixed to form a dough, without the application of external heat such as from steam injection or heating jackets. Heat generated by the mechanical mixing action in the mixer or heat provided by ingredients added at elevated temperatures may be used to maintain the dough temperature within a desired range.

Hydration of the pregelatinized waxy maize starch, the pregelatinized potato starch and the optional modified potato starch is critical for achieving their intended functions. Insufficient hydration of the pregelatinized waxy starch can result in substantial reduction or the elimination of desirable surface bubbles. Insufficient hydration of the pregelatinized potato starch or the modified potato starch may result in uncontrolled or excessive bubbling or bubbles which are readily broken or fractured, as well as loss of crispiness and crunchiness.

In forming a non-fermented or chemically leavened dough, hydration of the starches may be achieved by first premixing the pregelatinized waxy starch, such as pregelatinized waxy maize starch, with the pregelatinized potato starch and optional modified potato starch, to form a substantially homogeneous, dry preblend. The preblend of starches may then be admixed with preheated water to substantially uniformly hydrate each of the starches. Increasing the temperature of the preheated water facilitates hydration. Also, increasing the extent of hydration by the use of higher water temperatures helps to reduce the amount of the starches needed to perform their intended functions. However, if the temperature of the water is too high, the pregelatinized starches may become too adhesive, which may result in dough-machining problems caused by excessive dough stickiness.

The extent of hydration of the starches may be increased by increased dough lay or proof times. However, for the continuous mass-production of non-fermented snacks, excessive lay times are less efficient and may result in dough stickiness or doughs which are too tight to machine. In the production of non-fermented snacks in accordance with the present invention, dough lay times may range from about 30 minutes to about 2 hours. Also, at least a majority of the starches is hydrated sufficiently for bubble production and retention and the attaisment of a crispy, crunchy texture by the use of water preheated to a temperature of from about 145° F. to about 200° F., preferably from about 165° F. to about 190° F.

In embodiments of the invention, at least a substantial portion or all of the total added formula water may be preheated for hydration of the starches. For example, from about 55% by weight to about 85% by weight of the total added water may be preheated to about 165° F. to about 190° F. The remaining water may be admixed at a lower temperature with the at least partially hydrated starches to lower their temperature, so as to avoid excessive dough stickiness. For example, the remaining water may be added, at an ambient temperature of about 70° F. to about 100° F., with other ingredients such as flour and sugar which are at an ambient temperature of about 70° F. to about 100° F., to obtain a final dough temperature in the range of about 105° F. to about 115 ° F. In preferred embodiments, syrups and shortenings may be preheated, for example, to temperatures of about 110° F. to about 130° F., to reduce their viscosity and facilitate mixing.

In forming a fermented dough or sponge-good dough, hydration of the starches should be performed at temperatures which do not substantially destroy or kill the bacteria or yeast used in the fermentation. Hydration may be achieved by admixing the pregelatinized waxy starch, the pregelatinized potato starch, and optional modified potato starch with a sponge in the dough-up stage. The starches may be premixed and then added to the sponge, or they may be added individually to the sponge. The generally long fermentation times used in the production of fermented or sponge goods provide sufficient time for hydration of the starches at temperatures conventionally used for proofing or fermentation and formation of fermented doughs.

The starches are preferably added in the dough-up stage rather than in the sponge stage because the sponge is fermented or proofed substantially longer than is required for adequate hydration of the starches. Subjecting the starches to too long a proof time may result in excessive stickiness and a dough which is too tight for continuous sheeting and lamination. Also, addition of the starches in the dough-up stage avoids any possible interference with the fermentation in the sponge stage. Also, generally higher temperatures may be used in the dough-up stage than in the sponge stage, particularly towards the end of the fermentation, which may facilitate hydration of the starches. Exemplary proof times or fermentation times which may be used are preferably from about 8 hours to about 16 hours, most preferably from about 11 hours to about 13 hours for the sponge. Proof times or fermentation times in the dough-up stage, where hydration of the starches occurs, may range from about 2 hours to about 5 hours, preferably from about 2.5 hours to about 3.5 hours. The temperature of the sponge may, for example, be from about 70° F. to about 80° F. The temperature in the dough-up stage and during hydration of the starches, may, for example, be from about 70° F. to about 100° F.

Fermented Snack-Chip Dough Production

The fermented, wheat-based, bubbled snacks of the present invention are produced using a sponge stage and a dough-up stage. The basic ingredients in the preparation of a sponge are flour and water. The fermentation agents are yeast and bacteria. The yeast, flour, and the surfaces of the trough in which the sponge is formed can serve as sources of microflora. It is preferable to use a starter or inoculum from a previous batch of sponge to serve as a source of bacteria. A sponge flour is generally relatively strong, unbleached, with an ash content of 0.39 to 0.49%. It may have a protein content of about 7.5 to 13.0% (based on the weight of the flour, which is assumed to contain 14% moisture by weight) and an acid viscosity value in the range of about 60° to 90° M. A sponge may be produced by combining the flour, water, yeast, bacterial source, and flavoring ingredients, such as cheese, in a mixer, such as a spindle mixer or upright mixer.

It is preferable to add all of the water in the sponge-forming stage, to avoid an extra step in the dough-forming stage. However, a portion of the water may be added to the sponge in the dough-forming stage, in a manner which avoids disturbing the substantially uniform distribution of the leavening agents.

Exemplary relative amounts of the ingredients, which may be used in the formation of the sponge, are from about 50% by weight to about 70% by weight wheat flour, from about 25% by weight to about 35% by weight water, from about 1% by weight to about 15% by weight of flavoring ingredients, from about 0.05% by weight to about 1% by weight yeast, from about 0 to about 2% by weight diastatic malt or proteolytic enzyme, from about 0 to about 2% by weight yeast food, and from about 0 to about 2% by weight of starter or ferment. All percentages are based upon the total weight of the ingredients used to form the sponge. Known buffers can be added as needed to obtain a pH of about 5 to about 6.5 at the start of the fermentation.

Fermentation times (also referred to herein as sponge times) may be those conventionally used in the art to make fermented crackers. In the case of soda crackers or saltines, and the many variants of these products, such as oyster (soup) crackers, club crackers, cheese crackers, and the like, sponge times of about 2 to 24 hours are typically used. In preferred embodiments of the invention, sponge times which may be used are preferably from about 8 hours to about 16 hours, most preferably from about 11 hours to about 13 hours.

In preparing the sponge, no special order of mixing is required. Conventional processes can be used. Generally, the flour is dumped into a trough, a portion of the water containing dispersed yeast and buffer is added, the remaining ingredients of the sponge are added, and then the balance of the water is added. The sponge ingredients are mixed until substantial homogeneity is achieved.

When doughing-up the sponge, dough ingredients for mixing into the fermented sponge generally include flour and optional leavening or pH-adjusting agents and optional flavoring agents such as salt. The pregelatinized waxy starch, pregelatinized potato starch and optional modified potato starch are preferably added last.

In producing full-fat, reduced-fat or low-fat crackers, the shortening or fat may also be added in the dough-up stage. The addition of fat or shortening in the preparation of the sponge may decrease fermentation activity.

Minor amounts of water may be added in the dough-up stage. It is preferable to include all of the water as an ingredient of the sponge.

The dough-up wheat flour may be the same or different than the sponge wheat flour. For example, the dough-up wheat flour may be weaker than the sponge flour, and may have an ash content of about 0.43% to about 0.51% by weight, and an acid viscosity value of about 40° to 60° M.

The relative amounts of the sponge ingredients to the dough ingredients may generally be such that the weight-percent of flour used to form the sponge is from about 60% to about 75% by weight of the total amount of flour which is used.

Any emulsifiers used in the present invention are added in the dough-up stage, so as to ensure maximum fermentation. The liquid or "wet" emulsifiers, such as fluidized lecithin, are preferably added on the surface of the sponge, prior to flour addition. Keeping the "wet" ingredients in contact with the sponge minimizes lumping, as could otherwise occur if these ingredients were added on top of the flour in the dough-up stage. Dry ingredients such as salt, leavening agents, and the starch components may be added on top of the dough-up flour to avoid lumping. Any shortening or fat included in the formulation may be added last.

Hemicellulases may be added during sponge preparation, during sponge fermentation, or at a later time. However, adding the hemicellulase at dough-up is preferred, to avoid the possibility of interference with the sponge-fermentation process. For example, pentosanase is preferably added to the surface of the sponge, in a solution for even dispersion and avoidance of lumping, prior to flour addition. When, for example, pentosanases are used which work best at pH's of about 4.5 or 5, alkaline leavening agents, e.g. sodium bicarbonate, and alkaline calcium components preferably should be maintained separate from the pentosanases for as long as possible, to obtain consistently optimal results.

The dough-up ingredients and the sponge are then mixed to obtain a dough of substantial homogeneity. After mixing, the dough is proofed, or allowed to ferment further, as is conventional in the cracker art. The viscosity of the dough is also decreasing during this time. Generally, proofing times may range from about 2 hours to about 5 hours, preferably about 2.5 hours to about 3.5 hours, most preferably about three hours. Generally, the temperature of the sponge before doughing, the temperature of the dough after doughing, and the temperature of the dough at the dough-forming machine may be substantially the same. Somewhat higher temperatures may be used in the dough-up, particularly towards the end of the dough-up proofing time, than used before doughing-up. The higher temperatures may be used to assist in hydration of the starches, provided they do not substantially interfere with the action of the bacteria and yeast and do not create an excessively sticky dough.

The proofed dough may then be machined and baked to obtain wheat-based snack chips, having surface bubbles and a crispy, crunchy texture, in accordance with the present invention.

Unfermented Snack-Chip Dough Production

In preparing full-fat, no-fat, low-fat, and reduced-fat, unfermented, wheat-based, bubbled snack chips by the method of the present invention, the ingredients used may be basically the same as when preparing fermented, wheat-based, bubbled snacks, except that no yeast or bacteria is employed. Thus, the ingredients of the dough may comprise flour, water, optional shortening or fat, sodium bicarbonate and a food-grade acidic compound to effect leavening. Proteolytic, amylolytic, and pentosanase enzymes may be used. The flour used in unfermented, bubbled snack chips does not generally need to be as strong as the sponge flour used in fermented, bubbled snack chips, although the flour should be moderately strong. The dough used to prepare the unfermented, bubbled snack chips may comprise malt.

In addition to the aforementioned ingredients, doughs used to prepare unfermented, wheat-based, bubbled snacks by the method of the present invention may contain one or more sugars. For example, the sugar may be added as a mixture of sucrose with at least one humectant sugar, such as high fructose corn syrup, corn syrup, or glucose syrup.

Exemplary amounts of the sugars used per 100 parts by weight of flour in the dough may be from about 4 to about 12 parts by weight of sucrose and from about 1 to about 10 parts by weight of one or more humectant sugars.

When producing unfermented, wheat-based, bubbled snack chips by the method of the present invention, the conventional mixing steps of a creaming stage followed by a dough-up stage may be employed. In the creaming stage, all the ingredients, including the pregelatinized waxy starch, the pregelatinized potato starch and the modified potato starch of the present invention, may, for example, be creamed to substantially uniformly hydrate the starches with preheated water, in the absence of: the wheat flour, the optional shortening, and the optional sugar, leavening agents, and liquid pentosanase, and a portion of the total formula water.

In the creaming stage, the pregelatinized waxy starch, the pregelatinized potato starch, and the modified potato starch are preferably preblended with any optional crystalline or particulate sugar to obtain a dry preblend. The preblend is then preferably admixed with the hot water to substantially and uniformly hydrate the starches, without competition for the hot water from the remaining hydratable ingredients such as the wheat flour. The at least partially hydrated preblend of starches may then be admixed with the optional shortening or fat, the optional humectant sugars, and most or all of the remaining water to obtain a substantially homogeneous creamed mixture. The remaining water is preferably added at a water temperature which lowers the temperature of the partially hydrated starches, so as to avoid dough stickiness which would impede machinability.

In the dough-up stage, the flour may be added to the creamed mixture, followed by the optional leavening agents, and optional enzymes and flavoring components on top of the flour. The leavening agents and enzymes may be added, with a small portion of the remaining water, on top of the flour. To ensure uniform distribution of the minor ingredients throughout the dough, the flour added in the dough-up stage is preferably distributed substantially uniformly over the surface of the substantially homogeneous mixture formed in the creaming stage. The dough may be permitted to lay or be proofed for about 0.5 to about 2.0 hours to further hydrate the starches. Longer and shorter times are possible, provided sufficient hydration for achieving a cohesive, machinable dough which is bakable to a stable, bubbled surface and a crispy, crunchy texture is obtained.

Dough Machining and Baking

Various machining processes can be used to form the wheat-based, fermented and non-fermented doughs into dough pieces. Machining can include the processes used in standard cracker technology. For example, the wheat-based, fermented and non-fermented doughs of the present invention may be sheeted, optionally laminated, then cut and baked. Lamination is preferred for the controlled development of surface bubbles. Alternative machining processes include the use of a tortilla machine in which the dough-like composition is rolled and formed into pieces without being laminated.

In a preferred machining process, the dough is formed into a sheet by gauge or reduction rollers and enters a dough-laminating machine, such as a cut-sheet laminator or sweep-arm laminator. The laminating operation can be performed by overlapping lamina of about one-fourth inch thickness each, such that one sheet is placed upon another. Typically, between 3 to 6 laminae are layered together during this operation. The laminate may be formed by folding the sheeted dough upon itself. Separate dough sheets may also be used to form a laminate.

The laminated dough-like composition is then reduced in thickness. Reduction of the dough mass is performed in stages. For example, after three laminae are formed into a sheet, the sheet may then be compressed to about one-sixteenth inch. For four laminae, the dough sheet may first be reduced in thickness to about ½" and then to about ¼". The reductions in thickness may be performed by the use of one or more sets of counterrotating reduction rolls. In either case, a final reduction in thickness is done by a gauge roller. The dough is reduced during this operation to a final thickness of about ¹⁄₃₂ of an inch. At this point, the sheet generally has a width-to-thickness ratio of at least about 350.

The finish gauge-roll knives should be maintained sharp to provide a smooth dough sheet surface and to avoid formation of a rough surface on the dough sheet, which would reduce bubble formation. An even dusting of flour may be applied to the dough sheet surface before the finishing rollers to reduce stickiness and assure attainment of a smooth dough surface.

The machined dough-like composition is then cut into dough pieces. Cutting can be performed by a reciprocating cutter, a rotary cutter, or other dough-cutting mechanisms. The cut dough pieces may be circular, triangular, rectangular, or square in shape, shaped like a potato slice, or any other desirable configuration. In preferred embodiments, the dough piece is cut to provide a scalloped edge or periphery. The circular dough piece may have a diameter of about 1¼ inches to about 1¾ inches. A square dough piece may have a length and width of about 1 inch to about 1 ¼ inches. For a potato slice configuration, the maximum length of the dough piece may range from about 2 inches to about 3.5 inches. The maximum width of the dough piece may range from about 1.25 to about 2.5 inches. Topping salt can be added at about 0.5% to 2% of the final product weight.

Dockering or piercing the uncut sheet or cut pieces can optionally be included in the machining operation. Each dough piece preferably contains from about 1 to about 7 docker holes. In preferred embodiments, a docker hole is provided in about the center of the dough piece, to assist in avoidance of pillowing or puffing of essentially the entire piece. The docker holes may be the same or different in size. For example, in embodiments of the invention, the central docker hole may be larger than the remaining docker holes by a factor of about 2 or more. In addition to avoiding pillowing, dockering decreases the occurrence of "checking" or the formation of undesirable stress lines that cause breakage in the final product.

The cut pieces may then be conveyed or transported to a convection oven for baking. The dough sheeting, cutting, and dockering operations may occur at substantially the same dough temperatures and moisture contents as of the dough produced in the mixer. Thus, the dough pieces, upon entering a baking oven, may have a temperature of less than or equal to about 125° F., preferably less than about 120° F., and a dough moisture content of preferably about 23% by weight to about 38% by weight. During the baking step, the dough moisture content is substantially reduced to form a plurality of surface bubbles which comprise air pockets between opposing surfaces of the baked pieces. The dough-piece moisture content is preferably reduced from above about 23% by weight to preferably less than about 3.5% by weight during baking.

The dough pieces may be baked in conventional ovens, preferably a conventional gas-fired band oven having a plurality of temperature zones. The substantial reduction of the moisture content of the dough pieces in the baking oven causes the formation of curled configurations having a plurality of bubbles comprising air pockets substantially throughout the opposing top and bottom surfaces of the baked piece. The pieces may in addition have blisters, which extend from only one surface rather than two surfaces like a bubble. However, the baking preferably results in a predominance, for example greater than 50%, of the surface area delamination of each piece being in the form of bubbles rather than single surface blisters. The substantial reduction in moisture content during baking also substantially reduces checking of the final product. Upon exiting the gas-fired band oven, the baked pieces preferably have a moisture content of less than or equal to about 3.5% by weight, most preferably less than about 3% by weight, and a temperature of at least about 220° F. In embodiments of the invention, the product exit temperature may be from about 275° F. to about 310° F.

Exemplary baking temperatures within a multizone baking oven range from about 200° F. to about 650° F. Baking times may range from about 2 minutes to about 7 minutes. The fast application of higher temperatures yields a rapid formation of steam within the dough pieces. Steam, present within the pieces, gives rise to bubble formation as the pieces are being baked. The film-forming, pregelatinized waxy starch and the optional modified potato starch provide a film which entraps or holds moisture temporarily within the dough piece. Also, the exterior portions of the pieces dry rapidly and trap steam formed in the internal portion of the pieces. As the steam forms under an external layer, it performs a function similar to the leavening agent and causes expansion of the dough-like composition. With sufficiently thin dough pieces, the build-up of steam within the piece creates sufficient pressure to expand opposing surfaces at a given location on the piece to create a bubble comprising an air pocket at the location.

In preferred embodiments, the dough pieces are subjected to the highest heat in the first half of the oven, to generate bubbles and then set or case-harden the bubbles to prevent collapse of the bubbles, before entering the second half of the oven. The second half of the oven may then be operated at much lower temperatures for further moisture reduction and color development. Exemplary baking temperatures, which may be used within the first half of the oven for bubble generation and case-hardening, may range from about 450° F. to about 630° F. for top heating and from about 310° F. to about 500° F. for bottom heating. In preferred embodiments, the highest temperatures are used in the second zone for top heating at a temperature of at least about 500° F. for bubble development. Sealing or case-hardening of the bubbles preferably takes place in the third zone at a top-heat temperature of from about 50° F. to about 75° F. less than used in the second zone. The first zone may, for example, be operated at a temperature of from about 200° F. to about 425° F. Exemplary temperatures, which may be used in the second half of the oven for moisture reduction and browning, may range from about 200° F. to about 500° F. The band temperature is preferably at least about 275° F., most preferably at least about 300° F., in at least the second and third temperature zones.

After baking in the gas-fired oven, the dough pieces may be further dried by dielectric energy application, which disperses the moisture present within the piece and decreases the total moisture of the piece. In embodiments of the invention, the dielectric heating step may reduce the moisture content to a level which is from about 0.5% to about 1% by weight lower. For example, if the moisture content leaving the gas-fired oven is 2.5% by weight, the dielectric heating may be used to reduce the moisture content of the pieces to about 1.5% by weight to about 2% by weight. In preferred embodiments of the present invention, the moisture content of the dough pieces leaving the dielectric oven may be less than or equal to about 2.25% by weight. The dielectric heating tends to remove moisture from the areas of the dough piece having a higher moisture content, thereby reducing moisture gradients within the piece which tend to cause checking.

In preferred embodiments, the baked and optionally dielectrically treated pieces are sprayed with oil to increase palatability and provide a medium for the adhesion of seasoning ingredients. In addition, baked and optionally dielectrically heated pieces may be further subjected to moisture equilibration in an annealing tunnel at product temperatures of from about 140° F. to about 200° F., preferably from about 160° F. to about 190° F. Moisture reduction during annealing may range from about 0.2% to about 0.5%, which may further reduce checking. After baking and optional dielectric heating and optional annealing, the oil-sprayed product may be subjected to tumbling for the addition of particulate seasoning ingredients.

The moisture content of the products upon packaging is preferably from about 0.5% by weight to about 3.75% by weight, and their water activity or relative humidity is less than about 0.4, preferably less than about 0.3, most preferably less than about 0.2. The products are preferably packaged in vapor-proof packaging materials. The bulk density of the oil-topped snack products of the present invention may range from about 5 to about 9.5. The bulk density of the snack products without an oil topping may range preferably from about 6 to about 8 lbs. per cubic foot. The snack products of the present invention may contain the starch ingredients, such as the wheat flour, pregelatinized waxy starch, pregelatinized potato starch and the optional modified potato starch, in a total amount of at least 65% by weight, based upon the weight of the final product.

In other embodiments of the present invention, the dough pieces, after having their moisture content reduced to less than about 10%, preferably less than about 5%, most preferably less than about 3.5% by weight, by heating in air, such as in a gas-fired oven, may be subjected to frying to enhance flavor while keeping the fat or oil content of the final product low.

The following examples, wherein all parts, percentages, and ratios are by weight, and all temperatures are in ° F. unless indicated to the contrary, illustrate the present invention:

EXAMPLE 1

The ingredients and their relative amounts which may be used to prepare a cohesive, machinable dough for producing a fermented, wheat-based snack having a plurality of surface bubbles, a crispy, crunchy, chip-like texture and a cracker flavor are:

| Sponge Ingredients | Parts by Weight |
| --- | --- |
| Wheat flour, medium (about 13% by weight water) | 64.00 |
| Cheddar cheese (about 36% by weight water) | 13.00 |
| Flavoring and spices | 0.60 |
| Starter solution (protease, yeast and previous batch starter admixed with water) | 1.80 |
| Water | 31.50 |
| TOTAL | 110.90 |

The sponge may be formed at atmospheric pressure and room temperature by adding the cheddar cheese into an upright mixer and mixing it at high speed to break it up. The starter solution, flavoring and spices may then be added to the mixer. The water may then be added, followed by addition of the sponge flour. The ingredients may be blended to obtain a substantially homogeneous mixture. The blended mixture may then be fermented or proofed for 11 to 13 hours at about 70° F. to about 80° F.

Following this 11–13 hour fermentation, dough-up of the sponge may be effected with the following dough-up ingredients:

| Dough-Up Ingredients | Parts by Weight |
|---|---|
| Wheat flour, medium (about 13% by weight water) | 36.00 |
| Pregelatinized waxy maize starch | 5.55 |
| Pregelatinized potato starch | 12.22 |
| Minor ingredients (monosodium glutamate, autolyzed yeast extract, salt) | 3.20 |
| Sodium bicarbonate | 0.85 |
| TOTAL | 57.82 |

| Topping Ingredients | Parts by weight |
|---|---|
| Salt | 1.16 |
| Soybean oil, purified | 11.0 |

The pregelatinized waxy maize starch may be Modified Corn Starch X-Pand'R F4-612, which is a pregelatinized waxy maize starch produced by A.E. Staley Manufacturing Company. It has a moisture content of less than or equal to about 6% by weight and a pH of about 5.5 (+/−0.5). The particle size distribution of the X-Pand'R is about 20% maximum retained on a 50-mesh screen and about 30% maximum passing through a 200-mesh screen.

The pregelatinized potato starch may be Paselli P produced by Avebe America, Inc. The Paselli P is a pregelatinized potato starch which is a di-starch phosphate of potato starch, which is cold-water swelling. The Paselli P pregelatinized potato starch has a moisture content of about 5.5% by weight, a sulfated ash content of 0.1% maximum, a pH in a 5.0% aqueous solution of about pH 6.75, and a viscosity at 20° C. of about 11000 cps±2000 cps. The particle size distribution of the pregelatinized potato starch may be less than or equal to about 4% by weight retained on a 120-mesh screen.

The dough-up flour may be dumped on top of the sponge, followed by addition of the sodium bicarbonate, salt, monosodium glutamate, autolyzed yeast extract, X-Pand'R pregelatinized waxy maize starch, and Paselli P pregelatinized potato starch on top of the dough-up flour. The ingredients may be mixed at atmospheric pressure and room temperature to obtain a substantially homogeneous dough having a temperature of about 86° F. to about 96° F. The dough may then be proofed for about 2 to 4 hours to uniformly and substantially hydrate the pregelatinized waxy maize starch and the pregelatinized potato starch and to develop a gelatinous film. On a calculated basis, the dough moisture content may be about 30% by weight to about 32.5% by weight.

The proofed dough may then be transferred to conventional reduction rollers to form a continuous sheet of about ¼ inch in thickness. The sheet may be laminated in a conventional cracker dough sweep-arm laminating machine to obtain a laminate of three laminae. The three-layer laminate may then be reduced in thickness in three stages to a thickness of about 1/32 inch using reduction rollers. The first stage of rollers may reduce the laminate thickness to about ½ inch. The second stage of rollers may reduce the thickness to about ¼ inch. The last stage of rollers may reduce the dough-sheet thickness from about ¼ inch to the final 1/32 inch. The roll knives should be maintained sharp to avoid formation of a rough surface on the dough sheet, which would reduce bubble formation.

The laminate may be cut into square-shaped or rectangular-shaped pieces of about 1 3/16" to about 1 5/16" per side using a rotary cutter. The cut pieces may be cut so as to have a scalloped or nicked cut edge around their entire peripheries. The cutting may also produce five docker holes in each piece. The dockering may include a central docker hole which is larger than the remaining docker holes, to help prevent pillowing or puffing while obtaining substantial bubbling. Each of the four remaining docker holes may be located between the central docker hole and an outer edge of the dough piece, at approximately midway between opposing ends of the dough piece.

The scrap may be removed, the topping salt may be applied, and the pieces may then be conveyed through a conventional gas-fired band oven having seven temperature zones. Upon entry into the oven, the dough pieces may still have a moisture content of about 30% to about 32.5% by weight. The baking temperatures in the seven zones may range from about 250° F. to about 600° F. for top heating and from about 250° F. to about 500° F. for bottom heating. In the second and third zones, the baking temperatures may range from about 500° F. to about 600° F. for top heating and from about 360° F. to about 500° F. for bottom heating, to produce bubbles in the pieces in the second zone and to case-harden or seal the pieces and set the bubbles in the third zone. Baking temperatures in the remaining five zones may range from about 250° F. to about 375° F. to develop flavor and promote Maillard browning. The band temperature in at least the second and third zones may be at least about 285° F. The baking time may range from about 2.25 minutes to about 2.75 minutes. The moisture content of the dough pieces exiting the baking oven may be from about 1% by weight to about 3.75% by weight. The water activity or relative humidity of the pieces may be less than or equal to about 0.2. Upon exiting the gas-fired oven, the temperature of the pieces may be about 220° F. or higher. The exiting pieces have a bubbled, chip-like appearance. The bulk density of the baked product may range from about 6.8 to about 7.8 pounds per cubic foot.

The baked product may be transferred to a tunnel where it is sprayed with topping oil. The product may then be transferred to a packaging operation for packaging in moisture-proof bags. The final oil-sprayed product may have an oil content of about 11.3% to about 15.3% by weight, based upon the weight of the final product.

EXAMPLE 2

The ingredients and their relative amounts, which may be used to produce a cohesive, machinable dough for producing an unfermented, wheat-based snack having a plurality of surface bubbles, a crispy, crunchy, chip-like texture and cracker flavor, are:

| Dough Ingredients | Parts by weight |
|---|---|
| Wheat flour, medium (about 13% by weight water) | 100 |
| Modified potato starch | 12.22 |
| Pregelatinized waxy maize starch of Example 1 | 11.07 |
| Pregelatinized potato starch of Example 1 | 3.06 |
| Sucrose | 8.89 |
| Soybean Oil | 6.67 |
| High fructose corn syrup (about 71% solids) | 5.56 |
| Sodium bicarbonate | 1.25 |

-continued

| Dough Ingredients | Parts by weight |
|---|---|
| Calcium phosphate, monobasic monohydrate | 1.25 |
| Ammonium bicarbonate | 1.25 |
| Salt | 0.69 |
| Liquid xylanase solution | 0.275 |
| Water | 27.81 |
| TOTAL | 179.995 |

| Topping Ingredients | Parts by weight |
|---|---|
| Salt | 1.69 |
| Shortening (soybean spray oil) | 17.59 |

The modified potato starch may be Perfectamyl AC, which is a raw, acetylated (but not crosslinked) potato starch ingredient produced by Avebe America, Inc. It may have a moisture content of about 170 to about 190 mg/g, a pH of about 5.0 to about 7.0, and a sulfite content (as $SO_2$) of less than or equal to about 5 mg/kg. The particle size distribution of the modified potato starch may be less than or equal to about 8% by weight retained on a 120 U.S. mesh screen.

The source of xylanase used may be PEN #3 liquid concentrate. It has an activity of about 10250±750 XAU per ml and is sold by Quest International Bioproducts Group, 1833 57th Street, Sarasota, Fla. The liquid xylanase solution may be prepared by admixing 1 part by weight of PEN #3 liquid concentrate with 9 parts by weight of water. The amount of xylanase which would be added is equivalent to about 1281 XAU/lb flour, based on the manufacturer's colorimetric method as previously described for determining that activity. (XAU means xylanase activity units.)

The dough may be formed by first dry-blending the sucrose, modified potato starch, pregelatinized waxy maize starch and pregelatinized potato starch to obtain a substantially homogeneous preblend. Approximately 75% by weight of the water is preheated to a temperature of about 165° F. and is admixed with the preblend, to substantially hydrate the modified potato starch, pregelatinized waxy maize starch and pregelatinized potato starch and to develop a gelatinous film. The soybean oil, high fructose corn syrup and remaining water, all at a temperature of about 110° F. to about 130° F., may be admixed with the substantially hydrated preblend to obtain a creamed mixture. The flour may be added to the creamed mixture, then the sodium bicarbonate, calcium phosphate, salt, ammonium bicarbonate, and liquid xylanase solution may be added on top of the flour, all at an ambient temperature of about 70° F. to about 100° F. The ingredients may then be mixed to obtain a dough having a temperature of about 106° F. to about 114° F. The dough may be covered and then proofed or permitted to lay for about 0.5 hours to about 2.0 hours, during which further hydration of the modified potato starch, pregelatinized waxy maize starch and pregelatinized potato starch may be achieved. On a calculated basis, the moisture content of the dough may be about 24.5% to about 26% by weight.

The proofed dough may then be transferred to conventional reduction rollers to form a continuous sheet of about ¼ inch in thickness. The sheet may be laminated in a conventional cracker dough cut-sheet laminating machine to obtain a laminate of four laminae. The four-layer laminate may then be reduced in thickness in three stages to a thickness of about 1/32 inch using reduction rollers. The first stage of rollers may reduce the laminate thickness to about ½ inch. The second stage of rollers may reduce the thickness to about ¼ inch. The last stage of rollers may reduce the dough-sheet thickness from about ¼ inch to the final 1/32 inch. The roll knives should be maintained sharp to avoid formation of a rough surface on the dough sheet, which would reduce bubble formation.

The laminate may be cut into circular-shaped pieces of about 1⅝" using a rotary cutter. Each of the cut pieces may be cut so as to have a scalloped edge around its entire periphery. The cutting may also produce seven equally sized docker holes in each piece. The dockering may include a central docker hole, with the remaining six docker holes approximately equally spaced from the central docker hole and from each other, to help prevent pillowing or puffing while obtaining substantial bubbling.

The scrap may be removed, the topping salt may be applied, and the pieces may then be conveyed through a conventional gas-fired band oven having seven temperature zones. Upon entry into the oven, the dough pieces may still have a moisture content of about 24.5% to about 26% by weight. The baking temperatures in the front half of the oven may range from about 310° F. to about 535° F. In the back half of the oven, the baking temperatures may range from about 200° F. to about 480° F. The highest baking temperatures may be in the first half of the oven in the second and third zones to produce bubbles in the pieces in the second zone and to case-harden or seal the pieces and set or lock-in the bubbles in the third zone. Baking temperatures in the remaining zones develop flavor and promote Maillard browning. The band temperature in at least the second and third zones may be at least about 285° F. The baking time may range from about 2.5 minutes to about 3.0 minutes. The moisture content of the dough pieces exiting the baking oven may be from about 1% by weight to about 2.75% by weight. The water activity or relative humidity of the pieces may be less than about 0.2. Upon exiting the gas-fired oven, the temperature of the pieces may be about 220° F. or higher. The exiting pieces have a bubbled, chip-like appearance. The bulk density of the bake product may range from about 6.8 to about 7.8 pounds per cubic foot.

The baked product may be transferred to a tunnel where it is sprayed with topping oil. The sprayed product may then be transferred to an annealing tunnel to equilibrate its moisture and to reduce the moisture content by about 0.2% to about 0.4%. Upon exiting the annealing tunnel, the product temperature may be about 160° F. to about 190° F. The water activity or relative humidity of the pieces may be less than about 0.15. The product may then be transferred to a packaging operation for packaging in moisture-proof bags. The final oil-sprayed product may have an oil content of about 14% to about 18.5% by weight, based upon the weight of the final product.

EXAMPLE 3

The ingredients and their relative amounts, which may be used to produce a cohesive, machinable dough for producing an unfermented, wheat-based snack having a plurality of surface bubbles, a crispy, crunchy, chip-like texture and graham cracker flavor, are:

| Dough Ingredients | Parts by weight |
|---|---|
| Wheat flour, medium (about 13% by weight water) | 100 |
| Defatted wheat germ (about 7% by weight water) | 12.50 |
| Modified potato starch of Example 2 | 13.75 |
| Pregelatinized waxy maize starch of Example 1 | 12.50 |
| Pregelatinized potato starch of Example 1 | 3.44 |
| Sucrose | 3.75 |
| Brown sugar | 6.25 |

| Dough Ingredients | Parts by weight |
| --- | --- |
| Soybean oil | 7.5 |
| High fructose corn syrup (about 71% solids) | 6.25 |
| Coloring | 0.18 |
| Wheat malt syrup (about 77% solids) | 3.75 |
| Ammonium bicarbonate | 1.41 |
| Sodium bicarbonate | 1.41 |
| Calcium phosphate, monobasic monohydrate | 1.41 |
| Minor flavoring ingredients (salt and autolyzed yeast) | 2.34 |
| Water | 30.50 |
| TOTAL | 206.94 |

| Topping Ingredients | Parts by weight |
| --- | --- |
| Salt | 2.19 |
| Shortening (soybean spray oil) | 18.04 |

The dough may be formed by first dry-blending the sucrose, brown sugar, modified potato starch, pregelatinized waxy maize starch and pregelatinized potato starch to obtain a substantially homogeneous preblend. Approximately 75% by weight of the water is preheated to a temperature of about 165° F. to 190° F. and is admixed with the preblend, to substantially hydrate the modified potato starch, pregelatinized waxy maize starch and pregelatinized potato starch and to form a gelatinous film. The soybean oil, high fructose corn syrup, coloring, wheat malt syrup, and the remaining water (except for a small portion which is used to dissolve the ammonium bicarbonate), all at a temperature of about 110° F. to about 130° F., may be admixed with the substantially hydrated preblend to obtain a creamed mixture. The flour may be added to the creamed mixture, then the sodium bicarbonate, calcium phosphate, defatted wheat germ, minor flavoring ingredients, and dissolved ammonium bicarbonate, all at an ambient temperature of about 70° F. to about 100° F., may be added on top of the flour. The ingredients may then be mixed to obtain a dough having a temperature of about 108° F. to about 112° F. The dough may be covered and then proofed or permitted to lay for about 0.5 hours to about 1.5 hours, during which further hydration of the modified potato starch, pregelatinized waxy maize starch and pregelatinized potato starch may be achieved. On a calculated basis, the moisture content of the dough may be about 23.5% to about 25% by weight.

The proofed dough may then be transferred to conventional reduction rollers to form a continuous sheet of about ¼ inch in thickness. The sheet may be laminated in a conventional cracker dough cut-sheet laminating machine to obtain a laminate of four laminae. The four-layer laminate may then be reduced in thickness in three stages to a thickness of about 1/32 inch using reduction rollers. The first stage of rollers may reduce the laminate thickness to about ½ inch. The second stage of rollers may reduce the thickness to about ¼ inch. The last stage of rollers may reduce the dough sheet thickness from about ¼ inch to the final 1/32 inch. The roll knives should be maintained sharp to provide a smooth dough-sheet surface and to avoid formation of a rough surface on the dough sheet, which would reduce bubble formation. An even dusting of flour may be applied to the dough-sheet surface before the finishing rollers to reduce stickiness and assure attainment of a smooth dough surface.

The laminate may be cut into square-shaped or rectangular-shaped pieces of about 1 5/16" to about 1 7/16" per side using a rotary cutter. The cutting may also produce three docker holes in each piece. The dockering may provide a central docker hole, with each of the two remaining docker holes being located near a corner, approximately on a diagonal of the dough piece, to help prevent pillowing or puffing while obtaining substantial bubbling. The corner docker holes may be located approximately 35% to 40% of the distance from the corner edge of the dough piece to the central docker hole.

The scrap may be removed, the topping salt may be applied, and the pieces may then be conveyed through a conventional gas-fired band oven having seven temperature zones. Upon entry into the oven, the dough pieces may still have a moisture content of about 23.5% to about 25% by weight. The baking temperatures in the seven zones may range from about 220° F. to about 615° F. for top heating and from about 200° F. to about 440° F. for bottom heating. In the second and third zones, the baking temperatures may range from about 535° F. to about 615° F. for top heating and from about 365° F. to about 440° F. for bottom heating, to produce bubbles in the pieces in the second zone and to case-harden or seal the pieces and set the bubbles in the third zone. Baking temperatures in the remaining five zones may range from about 200° F. to about 315° F. to develop flavor and promote Maillard browning. The band temperature in at least the second and third zones may be at least about 285° F. The baking time may range from about 2.5 minutes to about 3.0 minutes. The moisture content of the dough pieces exiting the baking oven may be from about 0.5% by weight to about 3% by weight. The water activity or relative humidity of the pieces may be less than or equal to about 0.2. Upon exiting the gas-fired oven, the temperature of the pieces may be about 220° F. or higher. The exiting pieces have a bubbled, chip-like appearance. The bulk density of the baked product may range from about 6.8 to about 7.8.

The baked product may be transferred to a tunnel where it is sprayed with topping oil. The sprayed product may then be transferred to a packaging operation for packaging in moistureproof bags. The final oil-sprayed product may have an oil content of about 13% to about 18% by weight, based upon the weight of the final product.

EXAMPLE 4

An unfermented, wheat-based snack having a plurality of surface bubbles, a crispy, crunchy, chip-like texture and graham cracker flavor may be produced as in Example 3, except the pieces may be conveyed through a conventional gas-fired band oven having six temperature zones. The baking temperatures in the six zones may range from about 295° F. to about 530° F. for top heating and from about 230° F. to about 400° F. for bottom heating. In the second and third zones, the baking temperatures may range from about 460° F. to about 530° F. for top heating and from about 375° F. to about 400° F. for bottom heating, to produce bubbles in the pieces in the second zone and to case-harden or seal the pieces and set the bubbles in the third zone. Baking temperatures in the remaining four zones may range from about 230° F. to about 390° F. to develop flavor and promote Maillard browning. The band temperature in at least the second and third zones may be at least about 300° F.

EXAMPLE 5

A fermented, wheat-based snack having a plurality of surface bubbles, a crispy, crunchy, chip-like texture and a cracker flavor may be produced as in Example 1, except the dockering may provide a central docker hole, with each of the four remaining smaller docker holes being located near a corner, approximately on a diagonal of the dough piece, to help prevent pillowing or puffing while obtaining substantial bubbling. The corner docker holes may be located approximately one-third of the distance from the corner edge of the dough piece to the central docker hole.

What is claimed is:

1. A method for the production of a baked, wheat-based snack having surface bubbles and a crispy texture comprising: admixing wheat flour, a pregelatinized waxy maize starch in an amount of from about 3% by weight to about 20% by weight, based upon the weight of the wheat flour, at least one potato starch ingredient, and water to hydrate said potato starch ingredient and said pregelatinized waxy maize starch and to form a machinable dough, wherein the amount of wheat flour is from about 30% by weight to about 80% by weight of said dough, and the water content of said dough is from about 20% by weight to about 50% by weight, based upon the weight of the dough, sheeting the dough, forming the dough into pieces, and baking the pieces to produce a plurality of surface bubbles in the baked pieces, said bubbles comprising air pockets and extending both above and below adjacent, generally flat, crispy, substantially unleavened areas of the baked pieces, wherein the ratio of the maximum vertical distance between the upper surface and lower surface of at least two bubbles per piece to the maximum thickness of said adjacent, generally flat, crispy areas is at least about 2:1.

2. A method as claimed in claim 1 wherein the at least one potato starch ingredient comprises a dehydrated potato product or an isolated potato starch.

3. A method as claimed in claim 1 wherein the weight ratio of the amount of said pregelatinized waxy maize starch to the total amount of potato starch is from about 0.45:1 to about 1:1.

4. A method as claimed in claim 1 wherein the amount of pregelafinized waxy maize starch is from about 5% by weight to about 15% by weight, based upon the weight of the wheat flour.

5. A method as claimed in claim 1 wherein said at least one potato starch ingredient comprises a pregelatinized potato starch.

6. A method as claimed in claim 5 wherein the amount of said pregelatinized potato starch is from about 1.5% by weight to about 20% by weight, based upon the weight of the wheat flour.

7. A method as claimed in claim 1 wherein said at least one potato starch ingredient comprises a modified potato starch.

8. A method as claimed in claim 7 wherein the amount of said modified potato starch is from about 5% by weight to about 18% by weight, based upon the weight of said wheat flour.

9. A method as claimed in claim 1 wherein said water is added at a water temperature of from about 145° F. to about 200° F. to hydrate said at least one potato starch ingredient and said waxy maize starch.

10. A method as claimed in claim 1 wherein the total amount of said at least one potato starch ingredient is from about 8% by weight to about 25% by weight, based upon the weight of the wheat flour.

11. A method as claimed in claim 1 wherein the amount of said wheat flour is from about 45% by weight to about 75% by weight, based upon the weight of the dough.

12. A method as claimed in claim 1 wherein said pieces are dockered.

13. A method as claimed in claim 1 wherein said baking reduces the moisture content of said pieces to less than about 5% by weight, based upon the weight of said pieces.

14. A method as claimed in claim 1 wherein at least one sugar is admixed with the wheat flour to form said dough.

15. A method as claimed in claim 1 wherein said at least one potato starch ingredient is an isolated potato starch.

16. A method as claimed in claim 1 wherein said dough is formed by admixing said at least one potato starch ingredient with a sponge to hydrate said starches.

* * * * *